(12) United States Patent
Vayhinger et al.

(10) Patent No.: US 7,432,457 B2
(45) Date of Patent: Oct. 7, 2008

(54) MOUNTING KIT FOR A WEIGHING CELL

(75) Inventors: Klaus Vayhinger, Lüneburg (DE); Andreas Kuchel, Hamburg (DE)

(73) Assignee: Sartorius Hamburg GmbH, Hamburg (DE)

( * ) Notice: Subject to any disclaimer, the term of this patent is extended or adjusted under 35 U.S.C. 154(b) by 20 days.

(21) Appl. No.: 11/365,338

(22) Filed: Mar. 1, 2006

(65) Prior Publication Data

US 2006/0196704 A1    Sep. 7, 2006

(30) Foreign Application Priority Data

Mar. 2, 2005 (DE) .................. 10 2005 010 134
May 4, 2005 (DE) .................. 10 2005 020 888

(51) Int. Cl.
  *G01G 21/28* (2006.01)
  *G01G 21/02* (2006.01)

(52) U.S. Cl. ................................ 177/154; 177/DIG. 9

(58) Field of Classification Search ......... 177/154–159, 177/184, 187, 189, DIG. 9
See application file for complete search history.

(56) References Cited

U.S. PATENT DOCUMENTS

| 3,997,014 | A |   | 12/1976 | Soderholm et al. |
| 5,111,896 | A | * | 5/1992  | Porcari et al. ........... 177/16 |
| 6,331,682 | B1 |  | 12/2001 | Hopkins et al. |

FOREIGN PATENT DOCUMENTS

| DE | 100 46 102 A1 |   | 3/2002  |
| EP | 1046889       |   | 10/2000 |
| EP | 1 046 889 A1  |   | 10/2005 |
| JP | 2003121250    |   | 4/2003  |
| JP | 2006-349659 A | * | 12/2006 |

* cited by examiner

*Primary Examiner*—Randy W Gibson
(74) *Attorney, Agent, or Firm*—Rankin, Hill & Clark LLP

(57) ABSTRACT

A mounting kit for a weighing cell includes a lower mounting plate, an upper mounting plate, two pressure pieces for receiving a weighing cell and at least one safety element forming an integrated fall-arresting, lifting or limiting safeguard. The safety element (6) has a connecting element and a stop element, and the connecting element and stop element are in positive engagement with one another. The connecting element and the upper pressure piece are connected to the upper mounting plate by adhesive force and the stop element and the lower pressure piece are connected to the lower mounting plate by adhesive force.

9 Claims, 1 Drawing Sheet

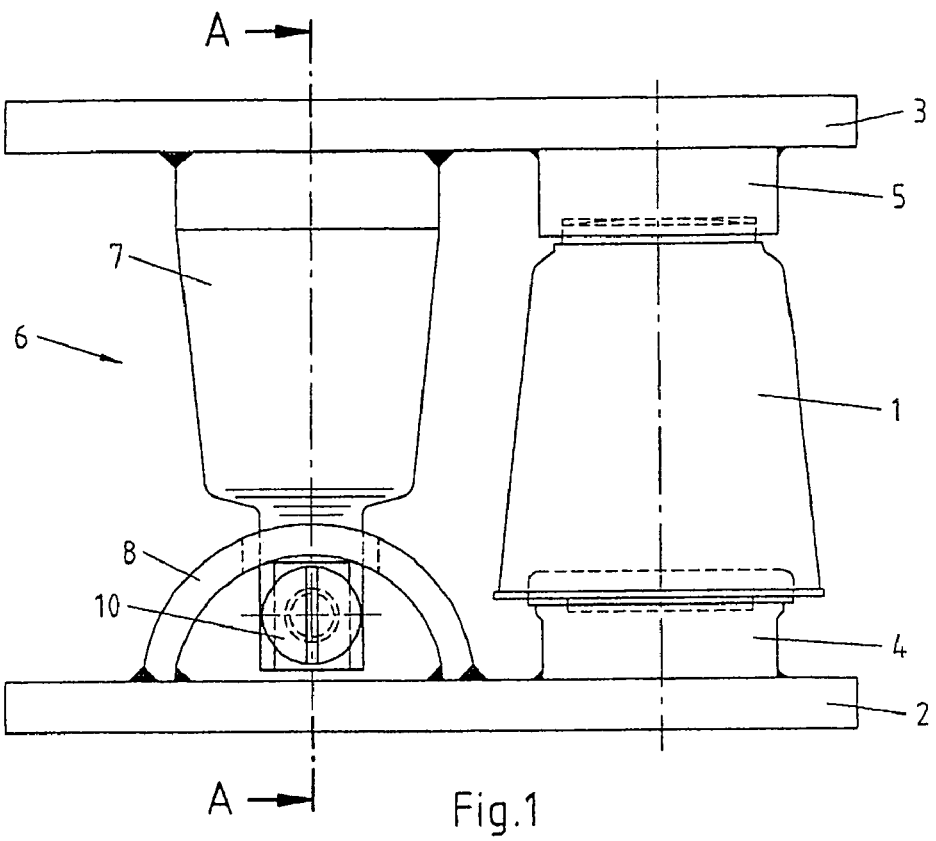
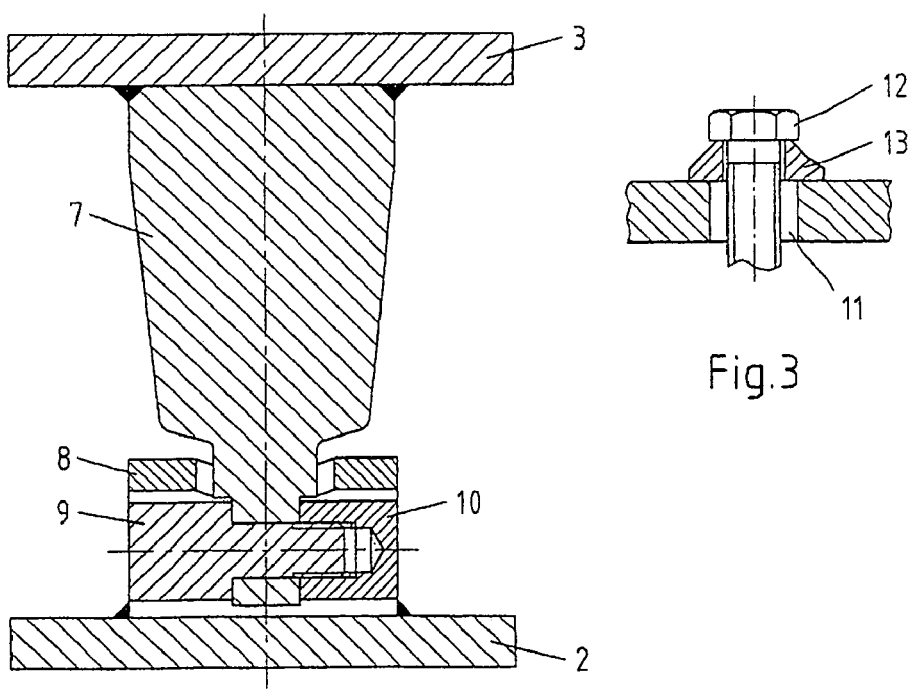

MOUNTING KIT FOR A WEIGHING CELL

The invention relates to a mounting kit for a weighing cell comprising a lower mounting plate, an upper mounting plate, two pressure pieces for receiving a weighing cell and at least one safety element forming an integrated fall-arresting, lifting or limiting safeguard, wherein the safety element comprises a connecting element and a stop element, wherein the connecting element and the stop element are in positive engagement to one another.

Weighing cells are used everywhere in industry where the weight of a container, silo, tank etc. is to be determined. In order to be able to use the metrological properties of the weighing cell as optimally as possible and to achieve correspondingly good weighing results, the weighing cells are built into specially adapted mounting kits by means of pressure pieces. In this case, a supporting plate connected to the feet of a silo for example transmits the force by means of at least one pressure piece to a weighing cell standing on a base plate of the mounting kit. In order that additionally acting forces in the horizontal or vertical direction have no negative influence on the weighing and the stability of the installation is ensured, ties, lateral stops, lifting safeguards or fall-arresting devices are provided to different extents.

In the mounting kits known so far for a weighing cell however it is disadvantageous that the mounting kits have many holes, cavities and indentations such as uncovered holes or screws, for example, in which dirt can accumulate and does not flow off by itself. Furthermore, corners and gaps and narrow intermediate spaces between plates and pressure pieces are located in the known mounting kits and these are barely accessible or cannot be inspected and are therefore difficult to clean so that fungi and bacteria can easily collect and multiply. In addition, horizontal surfaces from which dirt and cleaning liquids cannot run off by themselves are disadvantageous. Hygiene and therefore the possibility of simple cleaning are particularly important especially when a mounting kit is used for a weighing cell in the chemical and pharmaceutical industry and in the food and cosmetics industry (see regulations/guidelines GMP/EHEDG/HACCP).

Starting from the prior art which has been explained, it is the object of the invention to provide a mounting kit for a weighing cell wherein narrow gaps and undercuts or dead spaces are avoided with the aim of ensuring good and easy cleaning. Furthermore, it should be achieved that liquids largely flow off by themselves.

The object of a mounting kit for a weighing cell which has been derived previously and indicated is solved according to the invention by the connecting element and the upper pressure piece being connected to the upper mounting plate by adhesive force and the stop element and the lower pressure piece being connected to the lower mounting plate by adhesive force. The pressure pieces for receiving the weighing cell have the task of distributing the force from the round tops of the high-strength measuring element onto the surface of the less strong upper and lower mounting plate. As a result of the adhesive-force connections no joints, gaps or microscopic cavities are formed between the pressure pieces and the safety element and the lower and upper mounting plate in which protected underslippage spaces are formed for bacteria and fungi.

In an advantageous embodiment of the invention, the connecting element has a bolt-like round shape. The round shape avoids corners or cavities on the positive connecting element whereby deposits of dirt are avoided, optimal possibilities for cleaning are provided and liquids can flow off unhindered. Furthermore, the positive connecting element can have a conical shape.

A further advantageous embodiment of the invention consists in the stop element comprising an arcuate tubing section. As a result of the arcuate embodiment of the stop element, it is achieved that liquids automatically flow off from its surface. The cut surfaces of the stop element are connected by adhesive force to the lower mounting plate as described above. The stop element for the horizontal stop safeguard advantageously consists of an arcuate tubing section which has a through hole with a circumferential play through which the connecting element is guided. The through hole is dimensioned so as to ensure good and easy cleaning.

Since in one advantageous embodiment, the adhesive-force connection is preferably constructed as a welded, soldered or adhesive seam, gaps and holes formed with screw connections for example in which dirt readily accumulates are prevented. According to the invention these adhesive-force connections are located between the pressure pieces and the upper and lower mounting plate, between the safety element and the upper mounting plate or the connecting element and the upper mounting plate and between the cut surfaces of the arcuate tubing section and the lower mounting plate.

In a further advantageous embodiment of the mounting kit according to the invention, the connecting element has a through bore at the lower end in which a cross-bolt is disposed horizontally to the lower mounting plate with vertical play with respect to the stop element as a lifting safeguard. Any lifting of the load is avoided by the lifting safeguard where the cross-bolt has its upward movement in the vertical direction limited by the lower side of the stop element. Since the cross-bolt is configured as round and has no indentations, this prevents the accumulation of dirt.

Since in a further advantageous embodiment the cross-bolt is detachably fastened to the connecting element by means of a flange with a tapped hole, simple and rapid mounting is ensured. The cross-bolt is guided parallel to the lower mounting plate through the through-hole in the bolt and fixed at the other end to a flange having a tapped hole. In this case, the cross-bolt is merely connected to the connecting element and not to the lower mounting plate or the stop element.

Furthermore, in the advantageous embodiment of the invention a fall arresting device which prevents any falling of the load is provided, this being achieved by the connecting element being at a short distance from the lower mounting plate in the mounted state. The fall distance is limited to 4 to 5 mm, preventing any damage to the load or the weighing cell.

A further advantageous embodiment of the invention consists in the fact that the stop element covers the fall-arresting and lifting safety device and has a sufficiently large space below the stop element for easy cleaning. The stop element covers both the lower area of the connecting element and also the cross-bolt together with the flange. The stop element is shaped so that it has a sufficiently large diameter so that a sufficiently large space is formed between the lower mounting plate and the stop element which is easy to clean.

Furthermore, according to an advantageous embodiment of the invention, the surfaces are smoothed, especially electro-polished. The surfaces where the surface roughness is smoothed include the surfaces of the upper and lower mounting plate, the pressure piece, the weighing cell and the surfaces of the safety element. As a result of the smoothing, dirt or bacteria cannot accumulate on the surfaces.

Since large mounting holes are provided in the lower and upper mounting plate with horizontal play for mounting and for alignment of the mounting kit with respect to the load and the counter-bearing, the mounting holes being covered by cover plates in the mounted state, in a further advantageous embodiment the mounting kit can easily be aligned and the covering cover plates prevent any penetration of dirt and liquids into the mounting holes. The advantage of large-diameter mounting holes compared with the otherwise usual oblong holes is that the large-diameter mounting holes are simpler and less expensive to manufacture than the usual oblong holes but despite this, they simply equalise the manufacturing tolerances of the load and the manufacturing tolerances of the foundations in the horizontal direction. In an advantageous embodiment, the cover plates are configured so that they cover the mounting hole and enclose the screw located in the mounting hole, the cover plates having a downward sloping surface from the underside of the screw head towards the mounting plate. As a result of the downward-sloping surface, no dirt can deposit and liquid can run off well.

The invention is explained hereinafter with reference to drawings. Shown schematically in the figures FIG. 1 is an exemplary embodiment of a mounting kit according to the invention for weighing cells in a side view FIG. 2 is a longitudinal section along the line A-A in FIG. 1 of a safety element of a mounting kit for weighting cells according to the invention FIG. 3 is an assembly hole of a mounting kit according to the invention.

The exemplary embodiment of a mounting kit of a weighing cell shown in FIG. 1 shows a weighing cell 1, a lower mounting plate 2, a load-bearing upper mounting plate 3, two pressure pieces 4, 5 for receiving the weighing cell 1 and a safety element 6. The two pressure pieces 4, 5 and the safety element 6 are each affixed according to the invention by means of adhesive-force connections to the lower mounting plate 2 and the upper mounting plate 3, thus avoiding holes, joins or gaps which are difficult to clean and in which bacteria and fungi can accumulate and multiply.

The safety element 6 comprises a connecting element 7 and a stop element 8, the connecting element 7 and the stop element 8 being in positive engagement to one another. In the exemplary embodiment shown the connecting element 7 is constructed in the form of a round, conical bolt which is embodied as a cylindrical pin at its lower half. As a result of the round shape, corners or cavities are avoided, thus preventing any deposits of dirt, providing optimal possibility for cleaning and allowing liquids to flow off unhindered.

At its upper end the connecting element 7 is fixed to the underside of the upper mounting plate 3 by adhesive force.

The lower end of the connecting element 7 is not fixed to the lower mounting plate 2 but the connecting element 7 is at a distance of 4 to 5 mm from the lower mounting plate 2 in the mounted state, thus forming a fall-arresting device. In the event of failure of the weighing cell 1, the falling distance of the upper mounting plate 3 connected to the load is limited since the underside of the connecting element 7 then comes to rest on the lower mounting plate 2, avoiding any overturning of the load.

The stop element 8 is executed in the form of an arcuate tubing section where the cut surfaces of the stop element 8 are connected to the lower mounting plate 2 by adhesive force. At the centre of the arc the stop element 8 has a through hole having a sufficiently large play through which the connecting element 7 is guided in the area of the cylindrical pin. By means of the stop element 8 the horizontal range of movement is delimited in two directions by a lateral stop which is necessary in the event of excessive movement of the container located on the upper mounting plate 3.

FIG. 2 shows a longitudinal section of a safety element 6 along the line A-A in FIG. 1. In this representation it can be identified that the connecting element 7 has a through hole at its lower end in the area of the cylindrical pin, through which a cross-bolt 9 is guided horizontally to the lower mounting plate 2. This cross-bolt 9 is detachably connected to the connecting element 7 by means of a flange 10 which has a tapped blind hole, thus ensuring simple and rapid mounting. The cross-bolt 9 exhibits play in the vertical direction to the stop element 8, preventing any lifting of the load by impact of the cross-bolt 9 on the underside of the stop element 8.

FIG. 3 shows a mounting hole 11 of a mounting kit according to the invention. These mounting holes 11 through which the fixing screws 12 are guided are located on the lower mounting plate 2 and on the upper mounting plate 3 and are used to assemble the mounting kit and to align the mounting kit with respect to the load and the counter-bearing. The mounting holes 11 exhibit a horizontal play whereby manufacturing tolerances of the load and manufacturing tolerances of the foundation can easily be compensated in the horizontal direction. Furthermore, in the mounted state the mounting holes 11 are covered by cover plates 13, where the cover plates 13 enclose the screws 12 located in the mounting holes 11 and in the embodiment shown, have a surface which slopes downwards from the underside of the screw head to the mounting plate 2, 3 at which liquid can automatically run off. The underside of the cover plate 13 ends flush with the mounting plate 2, 3 so that no gap is formed and as a result, no dirt can be deposited at these points.

The invention claimed is:

1. A mounting kit for a weighing cell comprising a lower mounting plate, an upper mounting plate, two pressure pieces for receiving a weighing cell and at least one safety element forming an integrated fall-arresting, lifting or limiting safeguard, wherein the safety element comprises a connecting element and a stop element, wherein the connecting element and the stop element are in positive engagement to one another,
   wherein the connecting element is connected to the upper mounting plate by adhesive force,
   wherein the upper pressure piece is connected to the upper mounting plate by adhesive force,
   wherein the stop element is connected to the lower mounting plate by adhesive force,
   wherein the lower pressure piece is connected to the lower mounting plate by adhesive force,
   wherein the stop element is constructed as a tubing section which forms an arch in cross section, and
   wherein the connection element comprises at its lower end a bore and a cross-bolt placed therein, said cross-bolt being disposed horizontally to the lower mounting plate with vertical play with respect to the stop element, said cross-bolt serving as a lifting safe guard.

2. The device according to claim 1, wherein the connecting element has a bolt-like round shape.

3. The device according to claim 1, wherein the adhesive-force connection is constructed as a welded, soldered or adhesive seam.

4. The device according to claim 1, wherein the cross-bolt is detachably fastened to the connecting element by means of a flange with a tapped hole.

5. The device according to claim 1, wherein the stop element covers the fall-arresting and lifting safety device and has a sufficiently large space below the stop element for easy cleaning.

6. The device according to claim 1, wherein the surfaces are electro-polished.

7. The device according to claim 1, wherein large mounting holes are provided in the lower and upper mounting plate with horizontal play for mounting and for alignment of the mounting kit with respect to the load and the counter-bearing, and wherein the mounting holes are covered by cover plates in the mounted state.

8. The device according to claim 1, wherein each adhesive-force connection is constructed as a welded, soldered or adhesive seem.

9. The device according to claim 1, wherein the integrated safe guard is entirely positioned at one side of the weighing cell.

* * * * *